Dec. 29, 1959 W. HEYWANG ET AL 2,919,389

SEMICONDUCTOR ARRANGEMENT FOR VOLTAGE-DEPENDENT CAPACITANCES

Filed April 26, 1956

Inventors.
Walter Heywang,
Gunther Winstel, &
Adolf Weis.

By [signature] Atty.

2,919,389

SEMICONDUCTOR ARRANGEMENT FOR VOLTAGE-DEPENDENT CAPACITANCES

Walter Heywang, Karlsruhe, Gunther Winstel, Steinweiler, Pfalz, and Adolf Weis, Karlsruhe, Germany, assignors to Siemens & Halske Aktiengesellschaft, Berlin and Munich, Germany, a corporation of Germany Application April 26, 1956, Serial No. 580,956

Claims priority, application Germany April 28, 1955

14 Claims. (Cl. 317—242)

This invention is concerned with a semiconductor arrangement for voltage-dependent capacitances.

The use of the voltage-dependent capacitance of a dry rectifier for timing or amplification purposes is known and, for example, described in German Patents Nos. 884,519 and 887,061. Oxide semiconductors, reduction semiconductors and selenium have been used as materials for dry rectifiers. It has also been known that care must be taken in the dimensioning and arrangement of the semiconductor, to keep the loss angle 6 as small possible and especially to keep $tg\delta$, that is, the tangent of the loss angle, smaller than 1 so as to obtain suitable amplification. In particular, it has been indicated that the barrier layer should be very thin, at the most on the order of $10^{-3}$ centimeter.

Investigations underlying the invention have however shown that the requirements given with respect to the angle of loss, the slight thickness and the semiconductor substances are insufficient for obtaining higher degrees of amplification or for utilizing the voltage dependent capacitance of the p-n junction, additionally for other purposes such as modulation.

In accordance with the invention, the zones of the semiconductor situated on both sides of the barrier layer, especially of the p-n junction, are to be formed so that they exhibit a resistance—preferably including that of the remaining bias resistors disposed in the rectifier circuit—which is, referred to the square centimeter of the barrier layer, smaller than about 20 ohms or better, smaller than 2 ohm cm.$^2$/number of megacycles in the working frequency range. If this condition which depends on the applied frequency is met, there will result a sufficiently small angle of loss, for example, smaller than 45°, and therewith, upon use of the voltage-dependent capacitance in an amplifier circuit, a considerable amplification factor. While the condition is of particular importance for high frequencies, the use of the invention for lower frequencies may also be advantageous on account of the junction regions.

It has also been found that the barrier layer alone is not a determining factor in the geometric dimensioning of the arrangement. In accordance with a particular object and feature of the invention, the semiconductor materials to be used are substances with higher band width, that is, substances with at least 0.7 to 0.8 E.V. for high frequency and at least 0.8 to 1.0 E.V. for low frequency, for example, germanium, silicon, combinations of elements of the III and V group of the periodic system, etc. It was also found that various measures must be observed depending upon whether the voltage-dependent capacitance is to be used for high or low frequencies.

It is in accordance with a further feature of the invention suitable in the use of the p-n junction for high frequency, to form the p-n junction as p-i-n or as p-s-n transition, that is, to insert between the two zones of opposite conduction type a narrow intrinsic zone and/or a narrow zone with weaker doping, so as to produce a form of rectifier known per se for use as high capacity rectifier. However, the advantages which are obtained with a high capacity rectifier are not utilized in an arrangement according to the invention because high capacity flow through the rectifier is not intended. The n-region is in a corresponding arrangement also doped lower than the p-region. The insertion of the intrinsic and/or weakly doped zone results in the advantage of imparting to the arrangement a high Zener voltage in spite of the relatively low path resistance and the arrangement can accordingly be highly loaded as a capacitance. The low path resistance is in turn required for keeping the loss of the capacitor, produced by the p-n junction, low for high frequency.

Until now, the question of asymmetry has not been fully clarified so far as the low frequency range is concerned. In accordance with the invention, a particularly small loss angle is at any rate obtained when the arrangement is made asymmetrical in the sense indicated above, especially with respect to the doping strength. No certain statement can be made now concerning which of the two regions, the p-region or the n-region should be doped higher than the other. In the case of a symmetrical arrangement, the angle of loss is at any rate greater.

The proposed procedure, to form the p-n junction in accordance with a well-defined mathematical function, and especially so that the impurity concentration at least at one side of the small p-n junction decreases with increasing distance from the junction, beginning with a certain relative maximum, thereafter increasing again for better leakage, is to be used at any rate for the high frequency as well as for the low frequency range.

The low resistance of the p-zone and the n-zone and, if provided, of an intrinsic zone, may be obtained by geometrical dimensioning. It is for this reason suitable to construct the entire semiconductor arrangement of extremely thin layers, obtained from a liquid and/or vapor phase, if desired, by the use of chemical reaction. Such layers may be produced, for example, by vaporization, spraying, cathode vaporization. The zones of different doping may be produced by embedding in the layers donators and/or acceptors during and/or after the formation of the layers. The impurity centers in the corresponding semiconductor zone may thereby be provided by known thermal treatment, if desired subsequently, either homogeneously or bunched so as to obtain desired doping gradients in the p-n junction and/or in the adjacent semiconductor zones in accordance with a suitable mathematical function.

In accordance with another object and feature of the invention, the barrier layer may be formed as a marginal layer, if desired with an intermediate layer, and the metallic contact as already previously proposed may thereby be provided chemically, electrochemically, by vaporization, spraying, cathode vaporization and the like. Another possibility of making the resistance values of the semiconductor layers low as desired resides in making the number of impurity centers relatively high. Generally speaking, it will be suitable to combine the two methods for reducing the resistance.

In accordance with a further object and feature, the doping with donators and/or acceptors is to be restricted as far as possible and traps, that is, recombination centers as well as adhesion centers are, by known purification and/or measures for obtaining ideal crystal structure, to be avoided to such extent that the semiconductor arrangement exhibits a relaxation- and/or recombination time interval $\tau$ of the charge carriers which is greater than the reciprocal value of the frequency $\upsilon$ in the operating range. This procedure is in contradiction to the properties of customary dry rectifiers which are produced with the diametrically opposite aim to make $\tau$ smaller than $1:\nu$. As compared with this situation, the high relaxation- and/or recombination time interval provided according to the invention has the effect of making the loss angle in the barrier range of the rectifier small.

The properties of the semiconductor arrangement according to the invention may be further improved, by employing other previously already proposed means for reducing the loss angle of the barrier layer capacitance, for example, corresponding asymmetrical doping in the p-region and in the n-region; also by utilizing particularly high mobility of the charge carrier based upon suitable choice of the semiconductor material, for example, semiconductor alloys, especially elements of the IV group of the periodic system or of $A^{III}B^{V}$, $A^{II}B^{VI}$, $A^{I}B^{VII}$ combinations as well as mixed crystals of these combinations. It is furthermore suitable, particularly for lower frequencies, to form the semiconductor body as a monocrystal. For high frequencies, it is however of advantage to dope the p-conducting zone higher than the n-conducting zone.

The surface of the semiconductor arrangement is to be subjected at least at the p-n junction and its vicinity to a surface treatment, in a manner previously proposed, so as to avoid as much as possible the disturbing effect of "channels" which cause shunts, particularly at low temperatures, thereby increasing the loss angle. The channels are eliminated and/or compensated by producing in previously proposed manner homoeopolar protective surface layers by irradiation with short wave preferably ultraviolet light and/or by the provision of dipole layers, preferably under barrier load, for example, in the form of finely divided titanate combinations or other substances with high dielectric constant and/or high dipole moment.

As had been said before, the proposed procedure, to form the p-n junction in accordance with a well-defined mathematical function, and especially so that the impurity concentration at least at one side of the p-n conjunction decreases with increasing distance from the junction, beginning with a certain maximum, thereafter increasing again for better leakage, is to be used at any rate for the high frequency as well as for the low frequency range. A high dielectric constant of the semiconductor material which suitably exhibits Perowski-structure, for example, a titanate or containing titanate, is particularly advantageous. In order to differentiate between the high- and low-frequency ranges, it may be mentioned that the limits of both ranges are assumed to lie within an interval of from 10 to 100 kilocycles.

A further object of the invention resides in finding ways for practically realizing the indicated features so as to produce corresponding structural elements adapted for use in circuit arrangements, preferably for operation with very high frequencies.

In accordance with a particular embodiment of the invention, the voltage-dependent capacitance is a semiconductor arrangement with at least one p-n junction, with great band spacing and low path resistance, produced by alloying and/or diffusing the required impurity centers, so as to obtain in at least a partial range of the p-n junction a very flat rise of the doping gradient. This partial range has preferably a very weak doping (so-called s-doping) which rises gradually toward one side while merging at the other side very steeply into a strong doping of the opposite conduction type.

In accordance with another object and feature, regions of different conduction type are to be alloyed and/or diffused into a slightly doped semiconductor crystal from both sides thereof, such regions having preferably pronounced different geometrical extent, especially the alloying and/or diffusion front forming the transition from high to low doping of the conduction type forming the base material extending over a multiple of the plane of the alloying and/or diffusion front which forms the p-n junction as such. The purpose is to reduce effectively the path resistance and to make the capacitance at the p-n junction as low as possible. In a particular embodiment of the invention, the transition to the opposite conduction type is produced by alloying and the transition to higher doping is produced by diffusion. In some cases, the doping gradient which is produced by diffusion may have to be corrected, simultaneously or subsequently, by an alloying operation.

The foregoing and other objects and features will appear from the description which will be rendered below with reference to the accompanying schematic drawings, wherein Fig. 1 is an explanatory diagram;

Figure 1:
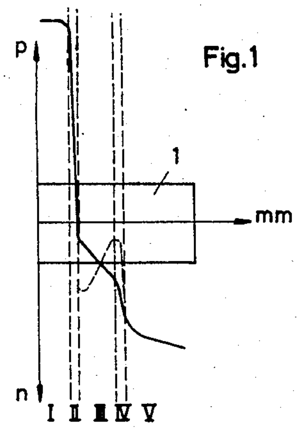

In Fig. 1, numeral 1 indicates a semiconductor silicon crystal made as a mono crystal. Upon the abscissa appears the spacing from the left crystal surface in millimeter (mm.). Along the negative side of the ordinate appears the concentration of the donators, that is, the magnitude of the n-conductivity, and along the positive side the concentration of the acceptors, that is, the magnitude of the p-conductivity. The crystal has five doping zones I—V as indicated in dotted lines. The representation is on a very much enlarged scale. In the zone I, the crystal is strongly p-conductive; in zone II, it is n-conductive. The p-n junction covers three zones II, III and IV. In zone II, the p-doping merges steeply with a slight n-doping. In zone III, there is provided a relatively flat rise of the n-doping merging with a relatively steep rise of the n-doping in zone IV. In zone V, there is n-doping which may be designated as normal. It should be at the most on the order of the p-doping in zone I, but may be less. The doping may in the range I and V be constant or somewhat rising at the crystal edge to provide for contacting. The above-described doping, shown in the full line curve, is determining for the steepness of the dependence of the capacitance of the p-n junction on the voltage applied and for the loss course during operation of the arrangement in barrier direction. Experimental and theoretical investigations have shown that with such doping course, the loss, especially $tg\delta$, that is, the tangent of the loss angle $\delta$, is very small, being at an operating frequency of a few mc., for example 5 mc., on the order of about $5\ 10^{-3}$. One the other hand, the desired steepness of the dependence of the capacitance on the voltage applied is with this doping course relatively low. It may be increased by reduced doping from left to right in a certain range of zone III to take the course indicated in dotted lines. Somewhat higher losses will thereby however result in the transition region of the p-n junction. A compromise solution between the two indicated doping courses may be applied depending upon the purpose for which the arrangement is to be made. It is, however, essential for the invention that there is in the p-n junction a region of slight doping, so that the junction takes the p-s-n characteristic, wherein *s* is a region of slight doping of one of the two conduction types.

So far as the principle is concerned, there are several different ways for producing the described p-s-n junction. In a manner already proposed before, a mixture of two donators or acceptors of different diffusion velocity and/or alloyability may be alloyed and/or diffused into the crystal, for example, a silicon crystal, only from one side thereof. In the case of an n-conducting semiconductor crystal, the mixture will preferably comprise two acceptors, for example, aluminum, gallium and/or indium. A steep and a somewhat flatter alloying or diffusion front will be superimposed due to the different diffusion velocity of the acceptors, producing first a very steep doping gradient according to zone II, which extends into a flatter gradient according to zone III. If it is desired to obtain the dotted course according to Fig. 1, a donator of particularly high diffusion velocity will be added to the mixture, such donator causing shortly ahead of the zone IV a steep relative rise of the donator concentration.

In accordance with a particular embodiment of the invention, the doping conditions which may be desired in any given case may be produced with greater certainty and accuracy by starting with an initial semiconductor material exhibiting the slight s-doping of the central zone III. The zones I and II on the one hand and IV and V on the other hand are thereupon produced by respectively embedding donators and acceptors from both sides of the semiconductor crystal. This is suitably done by applying on one side alloying and on the other side diffusion.

Figure 2:
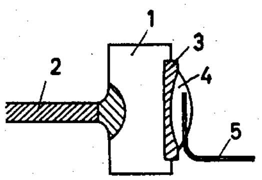
Fig. 2 shows a semiconductor silicon crystal with p-n junction.

Fig. 2 shows a semiconductor silicon crystal 1 produced as described and having a p-n junction. In accordance with the example given, the crystal is assumed to be slightly n-conductive. Numeral 2 indicates a wire 2 made of or containing acceptor material which is in known manner alloyed to the crystal. A certain depth of penetration of the corresponding alloying front must thereby be maintained, such depth depending upon desired working conditions, the depth determining the capacitance produced by the p-n junction. If the capacitance is to be about 160 microfarad at about 50 V working voltage and a Zener voltage of about 100 V, the alloying surface of the wire 2 will be on the order of about 5 square millimeter. These requirements are naturally difficult to meet in carrying out the alloying operation. Therefore, in accordance with a further feature, the alloying operation will be continuously controlled by measuring the ohmic contact resistance by current flow at a current measuring instrument. A relatively high contact resistance will be present so long as the heating of the wire 2 has not progressed to a point of reaching eutectics between the wire material and the semiconductor material. At the moment when the point of the wire volatilizes, this resistance will suddenly break down, such moment being a criterion for the instant at which the alloying operation is to be interrupted.

The zone 3 of higher n-doping at the right side of the semi-conductor crystal 1 is produced in accordance with a known diffusion operation. A donator material is embedded from a gaseous phase or electrolytically or otherwise, suitably by heat treatment and if desired by applying electric fields. This may be done under certain conditions by applying a thin layer of donator material upon the crystal surface by vaporization, in powder form and/or galvanically or otherwise, and subsequently applying heat treatment to diffuse the material at least in part into the crystal. The donator material may under some conditions consist of a mixture of several, especially of two donators of different diffusion velocity so as to produce the desired doping gradient. It has been found particularly suitable to form upon the doping zone 3 a further doping zone 4, by alloying, and to embed therein a metallic terminal 5. Donators reach into and through the layer 3 due to the alloying operation and/or incident to a subsequently applied heat treatment. The object thereby is to fix as accurately as possible first, the geometric formation and the plane configuration of the diffusion zone 3. The corresponding surface amounts in the indicated example four to five times of the surface of the alloying front 3. After fixing the geometric configuration of the zone 3, the doping gradient within such zone and closely ahead thereof within the s-conductive region of the crystal are corrected by the subsequent alloying operation.

Figure 3:
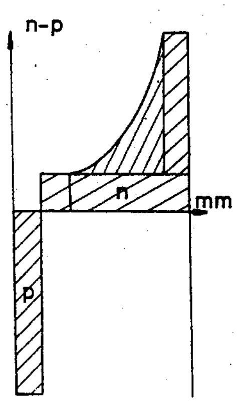
Figs. 3 and 4 illustrate the doping conditions and production thereof.
Figure 4:
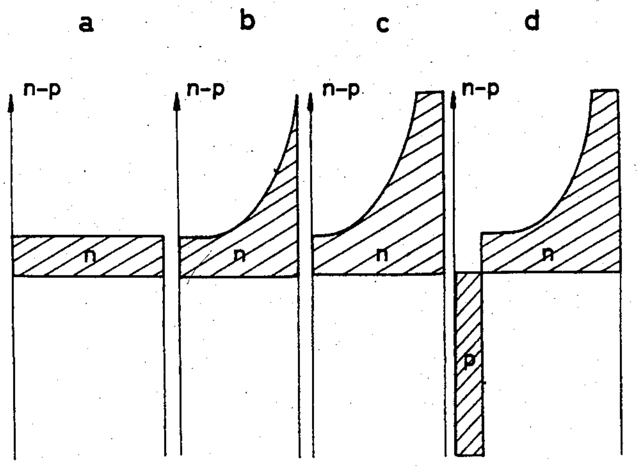

Figs. 3 and 4 show in schematic manner the doping conditions and operations for producing the doping.

Fig. 3 shows doping conditions along a cross-section of the completed semiconductor crystal. The difference of the donator and acceptor concentration n-p appears along the ordinate; the obscissa represents the geometric spacing of crystal sections from the left marginal surface of the crystal 1 shown in Fig. 2.

The illustrations *a*, *b*, *c* and *d* of Fig. 4 show the four operation steps for producing the doping indicated in Fig. 3.

Figs. 4*a* shows the doping condition of the initial semiconductor crystal which is provided with a slight n-doping in the production thereof. As indicated in Fig. 4*b*, a donator is diffused into the semiconductor crystal from the right side thereof, by one of the methods indicated before. The path resistance on the right side of the crystal is thereby reduced. In a further operation, indicated in Fig. 4*c*, either the same donator material or better, a donator with lower diffusion velocity is alloyed into the crystal, thereby increasing the n-doping near the right surface and making steeper the transition from the slight doping to the strong doping from the left to right at the right end. In a further operation, according to Fig. 4*d*, an acceptor material is alloyed into the crystal surface from the left, thereby overcompensating within a narrow zone underneath the left surface the slight initial n-doping by strong p-doping, thus completing the final doping according to Fig. 3. The operations 4*c* and 4*d* may under some circumstances be carried out simultaneously.

A particularly important field of application for a voltage-dependent capacitance as represented by a p-n junction which is made in accordance with the invention, is a phase modulator. Phase modulators have been constructed until now in the form of automatic induction-capacitance chains with magnetic means for varying the self-acting induction. A particular embodiment of the invention resides in the provision of a LC-chain especially for phase modulation purposes, wherein the individual capacitances are constructed respectively as semiconductor arrangements with barrier layers and as semiconductor arrangements with p-n junctions, the barrier layers and p-n junctions being respectively employed as voltage-dependent capacitances.

Figure 5:
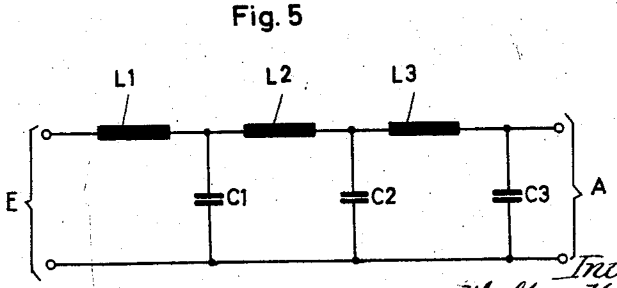
Fig. 5 illustrates an example of using the invention.

An example of such an embodiment is schematically shown in Fig. 5. References L1, L2, L3 indicate automatic inductions which need not be variable. References C1, C2, C3 indicate three semiconductor arrangements according to the invention, each having at least one p-n junction, serving as voltage dependent capacitances. Reference E indicates the input and A the output of the LC-chain. The voltage drop resulting along the chain produces a phase shift of the alternating voltage which depends on the frequency. As compared with known magnetic phase modulation arrangements with variable self-induction, the capacitive phase modulator arrangement according to the invention has the advantage of reduced control operation, higher thermal constancy and reduced size.

A prerequisite is that the characteristics of the individual p-n junctions, serving as voltage dependent capacitances, are quite similar; particularly, the capacitances of the individual elements should differ by less than 2–10% and the steepness should differ by less than 5–20%. These permissible tolerances may be relatively faithfully kept by the production steps described.

In accordance with a special embodiment, differences in the individual mass produced elements may be equalized by the provision of serially connected voltage independent capacitances which are high as compared with the voltage dependent capacitances. If desired, the series capacitances may be bridged by corresponding high ohmic resistors.

Changes may be made within the scope and spirit of the appended claims.

We claim:

1. A semiconductor device for use as a voltage-dependent capacitor comprising a crystal which is initially slightly conductive in accordance with a predetermined conductively type, a first zone provided on one side of said crystal which is of the same conductivity type but has greater magnitude of conductance, said first zone comprising an inner layer which is diffused into said crystal and an outer layer which is alloyed to said inner layer, a terminal extending from said outer layer, a second zone alloyed to said crystal at the other side thereof, said second zone being of a conductivity type opposite to that of said first zone and the magnitude of conductance thereof corresponding substantially to that exhibited by the outer layer of said first zone, and a terminal extending from said second zone.

2. A semiconductor device according to claim 1, wherein said initial crystal is slightly n-conductive, the layers of said first zone being likewise n-conductive and exhibiting increasing magnitude of conductance, said second zone being p-conductive, said second zone forming with said crystal and the layers of the first zone a pn-junction having a barrier layer, the capacitance of said barrier layer having in operation a loss angle smaller than 45°, and the resistance effective to the layers of said first zone bordering on said barrier layer being in operation with reference to the square centimeter of said barrier layer lower than 20 ohm cm.$^2$/number of mc in the operating frequency range.

3. A semiconductor device according to claim 1 wherein the layers of said first zone are doped layers exhibiting extremely high charge carrier density.

4. A semiconductor device according to claim 2 wherein the layers of said first zone are doped layers exhibiting extremely high charge carrier density, said doping being asymmetrical and the asymmetry thereof corresponding at least to the magnitude of the mobility condition of the charge carriers, the doping of said second p-conductive zone exceeding that of said first n-conductive zone.

5. A semiconductor device according to claim 2 wherein the layers of said first zone are doped layers exhibiting extremely high charge carrier density, said doping being asymmetrical and the asymmetry thereof corresponding at least to the magnitude of the mobility condition of the charge carriers, the pn-transition being at least in a region thereof spatially distributed in accordance with a desired characteristic of the voltage dependence, the impurity center concentration decreasing at least on one side of the pn-junction from a predetermined maximum with increasing distance from such junction and thereafter increasing again to provide for improved leakage.

6. A semiconductor device according to claim 2 wherein said pn-junction comprises impurity centers to produce in a portion thereof s-doping and a relatively flat rise of the doping gradient.

7. A semiconductor device according to claim 3 wherein the respective relaxation and recombination time interval of said charge carriers exceeds in operation the reciprocal value of the frequency in the operating frequency range.

8. A semiconductor device according to claim 3 wherein the arrangement is asymmetrical as to doping and concentration and conductivity type, respectively.

9. A semiconductor device according to claim 7 wherein the band width of the material of said crystal exceeds 0.7 E.V.

10. A semiconductor device according to claim 7 wherein the band width of the material of said crystal exceeds 0.8 E.V.

11. A semiconductor device according to claim 8 wherein the asymmetry of said doping corresponds at least to the magnitude of the mobility condition of the charge carriers.

12. A semiconductor device according to claim 8 wherein the asymmetry of said doping exceeds by a factor 10 the magnitude of the mobility condition of the charge carriers.

13. A semiconductor device according to claim 6 wherein the junction plane respectively between *p* and *n* conduction type and strong and weak doping of the identical conduction type exhibits different geometrical dimensions.

14. A semiconductor device according to claim 13 wherein the dimension of the junction plane between weak and strong doping is a multiple of the pn-junction surface.

References Cited in the file of this patent

UNITED STATES PATENTS

| | | |
|---|---|---|
| 1,865,213 | Ruben | June 28, 1932 |
| 2,182,377 | Guanella | Dec. 5, 1939 |
| 2,267,954 | Schumacher | Dec. 30, 1941 |
| 2,817,798 | Jenny | Dec. 24, 1957 |
| 2,829,422 | Fuller | Apr. 8, 1958 |